(12) United States Patent
Govindarajan et al.

(10) Patent No.: US 11,128,678 B2
(45) Date of Patent: Sep. 21, 2021

(54) MULTI-PLATFORM DIGITAL RIGHTS MANAGEMENT FOR PLACESHIFTING OF MULTIMEDIA CONTENT

(71) Applicant: SLING MEDIA PVT LTD, Bangaluru (IN)

(72) Inventors: Jagan Kumar Govindarajan, Bangalore (IN); Satish Iyer, Bangalore (IN)

(73) Assignee: SLING MEDIA PVT LTD, Bangaluru (IN)

( * ) Notice: Subject to any disclaimer, the term of this patent is extended or adjusted under 35 U.S.C. 154(b) by 0 days.

(21) Appl. No.: 16/803,400

(22) Filed: Feb. 27, 2020

(65) Prior Publication Data
US 2020/0204596 A1    Jun. 25, 2020

Related U.S. Application Data

(63) Continuation of application No. 15/638,073, filed on Jun. 29, 2017, now Pat. No. 10,616,287.

(51) Int. Cl.
*G06F 15/16* (2006.01)
*H04L 29/06* (2006.01)
(Continued)

(52) U.S. Cl.
CPC ...... *H04L 65/1069* (2013.01); *G06F 16/1824* (2019.01); *G06F 16/71* (2019.01);
(Continued)

(58) Field of Classification Search
CPC .......... H04L 65/1069; H04L 29/06027; H04L 47/12; H04L 47/801; H04L 65/4069;
(Continued)

(56) References Cited

U.S. PATENT DOCUMENTS

2003/0095791 A1* 5/2003 Barton ............... H04N 21/4334
386/230
2005/0195978 A1* 9/2005 Babic .................. H04L 63/0428
380/231
(Continued)

*Primary Examiner* — David R Lazaro
*Assistant Examiner* — Mariegeorges A Henry
(74) *Attorney, Agent, or Firm* — Lorenz & Kopf, LLP (57) ABSTRACT

Devices, methods, and program products are provided, which support multiple Digital Rights Management (DRM) schemes or platforms during the placeshifting of media content. A given placeshifting session may be initiated between a placeshifting device and a user-controlled client media receiver executing a browser player. In one embodiment, the DRM placeshifting method includes storing, in a memory associated with the placeshifting device, DRM-protected content; receiving a request from the client media receiver over a communications network to stream the DRM-protected content to the device; and obtaining a placeshifting key and initialization instructions for the DRM-protected content. The DRM-protected content is streamed to the client media receiver in an encrypted format accessible with a placeshifting decryption key. In conjunction with streaming the DRM-protected content, initialization instructions is transmitted to the client media receiver containing information utilized by the browser player to obtain the DRM license from a first license server.

19 Claims, 3 Drawing Sheets

(51) Int. Cl.
G06F 21/10 (2013.01)
G06F 16/182 (2019.01)
H04L 12/801 (2013.01)
H04L 12/927 (2013.01)
H04L 29/08 (2006.01)
H04N 21/4405 (2011.01)
H04N 21/44 (2011.01)
H04N 21/41 (2011.01)
H04N 21/4627 (2011.01)
H04N 21/436 (2011.01)
H04N 21/266 (2011.01)
G06F 16/71 (2019.01)
H04N 21/2343 (2011.01)
H04N 21/2662 (2011.01)
H04N 21/433 (2011.01)
H04N 7/24 (2011.01)
H04N 21/84 (2011.01)
H04N 21/845 (2011.01)

(52) U.S. Cl.
CPC ........ *G06F 21/10* (2013.01); *H04L 29/06027* (2013.01); *H04L 47/12* (2013.01); *H04L 47/801* (2013.01); *H04L 65/4069* (2013.01); *H04L 65/607* (2013.01); *H04L 65/608* (2013.01); *H04L 65/80* (2013.01); *H04L 67/02* (2013.01); *H04N 21/23439* (2013.01); *H04N 21/2662* (2013.01); *H04N 21/26613* (2013.01); *H04N 21/4104* (2013.01); *H04N 21/4331* (2013.01); *H04N 21/43615* (2013.01); *H04N 21/4405* (2013.01); *H04N 21/44016* (2013.01); *H04N 21/4627* (2013.01); *G06F 2221/0706* (2013.01); *H04N 7/24* (2013.01); *H04N 21/84* (2013.01); *H04N 21/8456* (2013.01)

(58) Field of Classification Search
CPC ..... H04L 65/607; H04L 65/608; H04L 65/80; H04L 67/02; G06F 16/1824; G06F 16/71; G06F 21/10; H04N 21/23439; H04N 21/26613; H04N 21/2662; H04N 21/4104; H04N 21/4331; H04N 21/43615; H04N 21/44016; H04N 21/4405; H04N 21/4627
USPC .................................. 709/224, 231
See application file for complete search history.

(56) References Cited

U.S. PATENT DOCUMENTS

| | | | |
|---|---|---|---|
| 2008/0281697 A1* | 11/2008 | Whitehead | G06Q 30/02 705/14.41 |
| 2012/0017282 A1* | 1/2012 | Kang | H04N 21/8456 726/26 |
| 2012/0246462 A1* | 9/2012 | Moroney | H04L 63/10 713/151 |
| 2016/0371468 A1* | 12/2016 | Daniel | G06F 21/10 |
| 2017/0116393 A1* | 4/2017 | Choi | G09C 1/00 |

* cited by examiner

MULTI-PLATFORM DIGITAL RIGHTS MANAGEMENT FOR PLACESHIFTING OF MULTIMEDIA CONTENT

RELATED APPLICATION(S)

This application is a continuation of U.S. patent application Ser. No. 15/638,073, filed with the United States Patent and Trademark Office (USPTO) on Jun. 29, 2017, the entire contents of each application is hereby incorporated by reference.

TECHNICAL FIELD

The following discussion generally relates to media placeshifting and, more specifically, to systems, methods, and program products for enhancing the ease and effectiveness with which digital rights management is implemented across multiple platforms in placeshifting environments.

ABBREVIATIONS

AES—Advanced Encryption Standards;
CDM—Content Decryption Module;
CDN—Content Delivery Network;
CENC—Common Encryption;
DRM—Digital Rights Management;
DVI—Digital Visual Interface;
DVR—Digital Video Recorder;
HDMI—High-Definition Multimedia Interface;
HTTP—Hypertext Transfer Protocol;
I/O—Input/Output;
IV—Initialization Vector;
LAN—Local Area Network;
mDRM—multi-platform Digital Rights Management;
SPDIF—Sony/Philips Display Interface Format;
STB—Set-Top Box;
URL—Uniform Resource Locator
VPN—Virtual Private Network; and
WAN—Wide Area Network.

BACKGROUND

Certain STBs allow end users to view placeshifted media content utilizing a mobile phone, a tablet device, a laptop computer, or a similar device operated by an end user and remotely located from the STB (herein, a "client media receiver"). To initiate a placeshifting session, an authenticated, bidirectional connection is established between the STB and the client media receiver over the Internet, a LAN, a WAN, or a similar communications network. Utilizing a software application executed on the client media receiver, such as a browser player, the end user may select the media content that is desirably placeshifted for viewing at the client media receiver. In accordance with such user commands, the STB captures, encodes, possibly encrypts, and transmits the user-selected content to the client media receiver as a live media stream. Correspondingly, the client media receiver receives, decrypts (if needed), and decodes the media content, while presenting the streamed content in real time as the content is received by the receiver. In many instances, the client media receiver may avoid storage of the placeshifted content in non-transitory memory to mitigate any issues relating to the creation of unlicensed copies of the content.

While increasing the ease and convenience with which end users consume content, placeshifting has evoked concerns regarding the illicit copying and sharing of streamed content. Various DRM platforms or schemes have been developed to help deter such activities; however, existing DRM platforms are often limited in the context of placeshifting environments in which a user-selected browser player is utilized to control playback of content stored on an STB (or similar placeshifting device) located in the residence of an end user. Existing DRM platforms may be propriety and are often not universally shared between consumer devices, browser players, plugins, and other such software and hardware products. A non-exhaustive list of widely available proprietary DRM platforms includes PLAYREADY by MICROSOFT, FAIRPLAY by APPLE, WIDEVINE by GOOGLE, and PRIMETIME by ADOBE, all of which are exclusive to particular brands of devices and browser players. While alternative DRM platforms have been developed by groups including the MARLIN DEVELOPMENT COMMUNITY and the OPEN MOBILE ALLIANCE, such alternative DRM platforms also tend to be exclusive to a limited subset of commercially-available hardware and software products.

The lack of universality across DRM platforms creates difficulties in effectively maintaining DRM integrity in placeshifting environments, particularly when end users are permitted to select amongst a wide range of browser players to view placeshifted content on a given client media receiver. There consequently exists an ongoing industry demand for the provision of systems, methods, and program products supporting the effective implementation of a wide range of DRM platforms in placeshifting environments. Ideally, such systems, methods, and program products could be implemented in a relatively seamless manner, while providing little to no detriment to the ease and convenience with which end users can access and view placeshifted content utilizing a user-chosen browser player executed on a client media receiver. Other desirable features and characteristics will become apparent from the subsequent detailed description and the appended claims, taken in conjunction with the accompanying drawings and this background section.

BRIEF SUMMARY

Systems, methods, and program products are provided for enhancing the ease and effectiveness with which digital rights management is implemented across multiple platforms in placeshifting environments. The devices, methods, and program products described herein are particularly useful in facilitating the appropriate selection and implementation of DRM platforms during placeshifting sessions initiated between a placeshifting device, such as a STB or DVR, and a user-controlled client media receiver, such as a mobile phone, tablet device, or laptop computer. In one embodiment, the DRM placeshifting method includes the step or process of storing, in a memory associated with the placeshifting device, DRM-protected content. The placeshifting device further receives a request, as transmitted from the client media receiver over a communications network, to stream the DRM-protected content to the client media receiver. In response to this request, the placeshifting device streams the DRM-protected content to the client media receiver in an encrypted format accessible with a placeshifting decryption key.

In conjunction with streaming the DRM-protected content, the placeshifting device also transmits DRM initialization instructions to the client media receiver, which are subsequently utilized by the browser player to obtain a DRM license containing the placeshifting decryption key. The DRM initialization instructions can be embedded in the content stream generated by the placeshifting device; and, in certain instances, may contain URL addresses or other location information for contacting any selected one of a plurality of DRM license servers, each of which may issue licenses for a different type of DRM platform or licensing scheme. The client media receiver may then utilize this information, as contained in the DRM initialization instructions provided by the placeshifting device, to select the appropriate DRM license server from which to obtain the DRM license based upon the DRM platform type or types supported by the browser player.

In further implementations, the DRM placeshifting method includes the steps or processes of receiving, at a headend (herein, a "mDRM headend"), a request from a placeshifting device over a communications network for a placeshifting encryption key. The placeshifting encryption key can be utilized by the placeshifting device in encrypting placeshifted content, which is streamed to the client media receiver by the placeshifting device over the communications network. In response to receipt of this request, the mDRM headend generates the requested placeshifting encryption key along with a matching (e.g., symmetric or asymmetric) placeshifting decryption key. The mDRM headend transmits the newly-generated placeshifting encryption key over the communications network to the placeshifting device. In conjunction with transmission of the placeshifting encryption key to the placeshifting device, the mDRM headend further transmits the placeshifting decryption key over the communications network to at least one DRM license server. For example, the mDRM headend may transmit the placeshifting decryption key to multiple DRM license servers, such as a predetermined group of DRM license servers that cooperate with the headend to provide a cloud license service, with each license server generating licenses for a different type of DRM platform or licensing scheme. In certain cases, the mDRM headed may also receive, in return, DRM initialization instructions from the DRM license servers to which the decryption key is provided. The DRM initialization instructions may contain URL addresses or similar information that can be utilized by the receiver-executed browser player in obtaining a DRM license containing the placeshifting decryption key, which is subsequently utilized by browser player to decrypt content streamed to the client media receiver by the placeshifting device.

In still further embodiments, the DRM placeshifting method includes the step or process of transmitting a request over a communications network to a placeshifting device to stream DRM-protected content to a client media receiver. The DRM-protected content is received at a browser player, as executed on the client media receiver, in an encrypted format accessible with a placeshifting decryption key. Concurrent with or following reception of the DRM-protected content stream, the browser player obtains a DRM license containing the requisite placeshifting decryption key from a first DRM license server. The browser player then utilizes the placeshifting decryption key to decrypt the DRM-protected content for presentation to an end user operating the client media receiver. In certain implementations, the browser player may further receive DRM initialization instructions from the placeshifting device in conjunction with the DRM-protected content. In this case, the browser player may utilize information contained in the DRM initialization instructions to obtain the DRM license from the first DRM license server. If the DRM initialization instructions include contact information (e.g., URL addresses) for a plurality of DRM license servers, the browser player may identify the appropriate DRM license server from which to obtain a DRM license based upon the DRM platform type or types supported by the browser player. The browser player may then forward a request for the DRM license, along with data uniquely identifying placeshifted content and/or the client media receiver, to the appropriate DRM license server when the player or receiver seeks to obtain a corresponding DRM license, as required to decrypt the placeshifted content streamed to the client media receiver by the placeshifting device.

The foregoing methods can each be implemented utilizing program products, hardware products (e.g., electronic devices containing processors and computer-readable instructions for performing the above-noted process steps), and combinations thereof, as will become apparent from the following description. Various additional examples, aspects, and other useful features of embodiments of the present disclosure will also become apparent to one of ordinary skill in the relevant industry given the additional description provided below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. As appearing herein, the term "browser player" refers to a software application executed by an electronic device (a "client media receiver," as described below) allowing an end user to navigate, select amongst, and initiate playback of content during a placeshifting session.

Devices, methods, and program products are provided, which facilitate the appropriate selection and implementation of various different DRM platforms during placeshifting sessions. The methods described herein may be carried-out utilizing multiple electronic devices, which communicate communications network containing or consisting of the Internet, in a manner supporting the placeshifting of DRM-protected media content. These devices may include a multi-platform DRM or "mDRM" headend, a client media receiver, and a consumer placeshifting device, such as an STB or DVR located in the residence of an end user. To initiate a particular placeshifting session, the placeshifting device receives a request from the client media receiver, as controlled by an end user, over a communications network to stream DRM-protected content to the client media receiver. The DRM-protected content may be stored in a memory accessible by the placeshifting device; e.g., when the placeshifting device assumes the form of an STB having DVR capabilities, the DRM-protected content may be previously downloaded into the memory of the STB over a satellite or cable television distribution system. In response to receipt of the request, the placeshifting device streams the DRM-protected content to the client media receiver in an encrypted format accessible with a placeshifting decryption key. In conjunction with streaming the DRM-protected content, the placeshifting device may further transmit DRM initialization parameters or instructions to the client media receiver. The DRM initialization instructions may contain server-specific contact information, which can be utilized by the browser player to obtain a DRM license from a DRM license server to enable the browser player to decrypt, decode, and present the streamed content.

The placeshifting device may obtain a placeshifting encryption key and platform-specific DRM initialization instructions at any suitable juncture following storage of DRM-protected content. In certain implementations, the placeshifting device may obtain the DRM initialization instruction prior to initiation of a placeshifting session, such as at the beginning of a fixed or variable time period to enable faster response to the request from client media receiver. For example, the placeshifting device may obtain the DRM initialization instructions in response to initial storage of the DRM-protected content. In other implementations, the placeshifting device may obtain the DRM initialization instructions following requested streaming of the DRM-protected content by the user-controlled client media receiver. As indicated above, the DRM initialization instructions include data referenced by the client media receiver to obtain a DRM license containing a placeshifting decryption key and possibly other information. After the DRM license is obtained by the receiver, the client media receiver may extract the placeshifting decryption key from the DRM license and utilize the decryption key to decrypt the placeshifted media stream for presentation to the end user operating the receiver.

The DRM initialization instructions provided in conjunction with the encrypted placeshifting stream usefully include contact information, such as URL addresses, for a plurality of DRM license servers, each of which issues DRM licenses for a different type of DRM scheme or platform. This enables the client media receiver to select the appropriate DRM license server corresponding to the DRM platform type or types supported by the currently-executed browser player. The DRM initialization data may be collected and packaged by the mDRM headend, which communicates with multiple DRM license servers as part of a cloud license service, and then forwarded to the placeshifting device at an appropriate juncture. By virtue of this process, the client media receiver may present the DRM-protected content to the end user for a wide range of commercially-available browser players, generally independently of the particular DRM platform type or types supported by the chosen browser player. Furthermore, no additional action may be required on behalf of the end user beyond that typically performed when initiating a placeshifting session. The effective implementation of a wide range of DRM platforms in placeshifting environments is thus enabled, while maintaining the ease and convenience with which end users can access and view placeshifted content utilizing a chosen browser player executed on a client media receiver. This is highly desirable. Further description of exemplary embodiments of such mDRM systems, methods, and program products will now be set-forth in conjunction with FIGS. 1-3.

Figure 1:
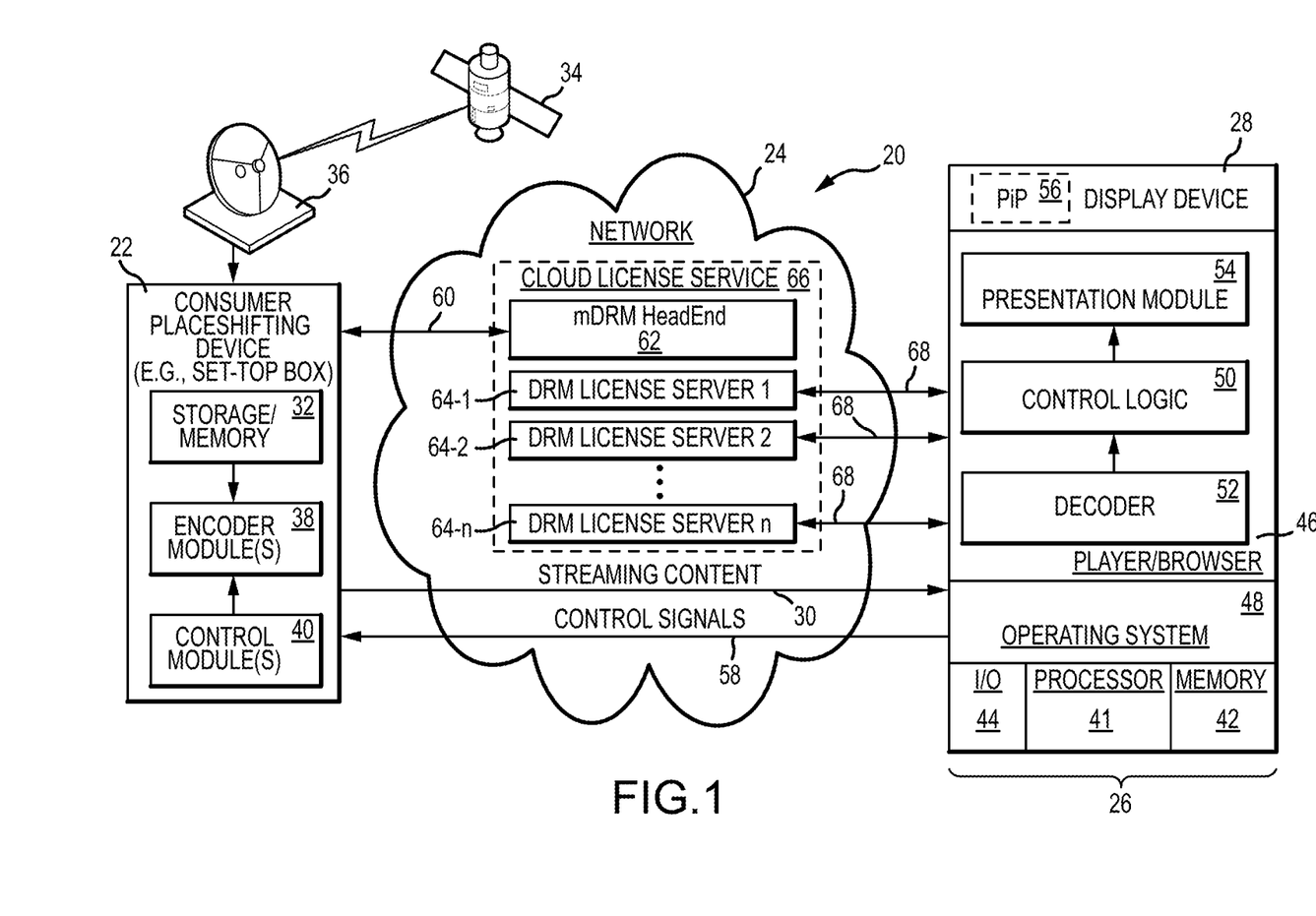
FIG. 1 is a schematic illustrating a placeshifting session during which DRM-protected content is streamed from a consumer placeshifting device, such as a DVR or STB located with the residence of an end user, to client media receiver controlled by the end user, as illustrated in accordance with an exemplary embodiment of the present disclosure.

FIG. 1 schematically illustrates a placeshifting system 20 suitable for carrying-out a placeshifting session and depicted in accordance with an embodiment of the present disclosure. In the illustrated example, placeshifting system 20 includes a placeshifting device 22, a client media receiver 26, and a display device 28. During usage of placeshifting system 20, bidirectional communication between placeshifting device 22 and client media receiver 26 occurs through a communications network 24, while client media receiver 26 outputs video (and possibly audio) signals over a wired or wireless connection to display device 28. The foregoing components can each be implemented utilizing any suitable number and combination of known devices including microprocessors, memories, power supplies, storage devices, interface cards, and other standardized components. Such components may include or cooperate with any number of software programs or instructions designed to carry-out the various methods, process tasks, encoding and decoding algorithms, and relevant display functions. Placeshifting system 20 may also include various other conventionally-known components, which are operably interconnected (e.g., through communications network 24) and not shown in FIG. 1 to avoid unnecessarily obscuring the drawing.

During a placeshifting session, placeshifting device 22 transmits streaming media content 30 through communications network 24 to client media receiver 26, which will typically be remotely located relative to device 22. The streamed media content may be DRM-protected and selected for viewing by an end user operating client media receiver 26. Placeshifting device 22 stores the media content in memory 32 and may obtain such content from any number and type of content sources. In one embodiment, placeshifting device 22 obtains a library of media content through selective recording of a satellite broadcast provided by a satellite 34 and received via a satellite antenna 36 operably connected to device 22. When appropriate, placeshifting device 22 recalls the appropriate media content from memory 32 and generates the content stream utilizing at least one encoder module 38, which operates under the command of a control module 40. Placeshifting device 22 then transmits the encoded content to remotely-located client media receiver 26 over communications network 24, as described more fully below. As generically shown in FIG. 1, modules 38, 40 can be implemented utilizing software, hardware, firmware, and combinations thereof. The encoded media stream will often contain both video and audio component streams, which may be combined with packet identification data. Any currently-known or later-developed packetized format can be employed by placeshifting device 22 including, but not limited to, MPEG, QUICKTIME, WINDOWS MEDIA, and/or other formats suitable for streaming transmission over communications network 24.

In various embodiments, an adaptive encoding approach may be utilized in encoding, transmitting, decoding, and requesting desired streaming media content. In this regard, encoder module 38 may generate adaptive streams consisting of the multiple sets of small encoded segment files or "streamlets," which can be interchanged to provide seamless playback as network conditions and other limiting resources change. For example, encoder module 38 may be configured to generate a high bandwidth stream, a low bandwidth stream, and/or any number of intermediate bandwidth streams containing the selected DRM-protected content during the course of the below described DRM placeshifting method. Client media receiver 26 may then select the stream having the parameter set best suited for the current playback conditions. For example, if a significant lag in programming playback should develop, client media receiver 26 can minimize such lags or potential interruptions in the presentation of the streamed media content by switching to a lower bandwidth stream, which my have a purposefully degraded frame rate, resolution, and/or other parameter lowering packet size and streaming bitrate. Several examples of adaptive streaming systems and techniques are described in U.S. Pat. No. 7,818,444, issued Oct. 19, 2012, and entitled "APPARATUS, SYSTEM, AND METHOD FOR MULTI-BITRATE CONTENT STREAMING," the contents of which are hereby incorporated by reference.

As schematically depicted in FIG. 1, communications network 24 can assume any form enabling the delivery of streaming content 30 and otherwise supporting data transmission between placeshifting device 22, client media receiver 26, and the below-described mDRM headend and/or DRM license servers. Generally, communications network 24 may encompass any number of digital or other networks enabling multiple nodes (e.g., devices 22, 26) to communicate using any common protocols and signaling schemes. In various embodiments, communications network 24 can consist of or include one or more open CDNs, VPNs, the Internet, and other communications networks implemented in accordance with TCP/IP protocol architectures or other conventional protocols. In other embodiments, communications network 24 may further encompass one or more wired or wireless LANs, WANs, a cellular network, and/or any other pubic or private networks. Communications network 24 as illustrated in FIG. 1, then, is intended to broadly encompass any communications network(s), systems, or architectures for transmitting data between the various components or devices forming the placeshifting system architecture.

Client media receiver 26 can assume the form of any electronic device, system, or the like suitable for performing the processes and functions described herein. A non-exhaustive list of suitable electronic devices includes mobile phones, wearable devices, tablet devices, laptop computers, and desktop computers. When engaged in a placeshifting session with placeshifting device 22, client media receiver 26 outputs visual signals for presentation on display device 28. Display device 28 can be integrated into client media receiver 26 as a unitary system or electronic device. This may be the case when, for example, client media receiver 26 assumes the form of a mobile phone, tablet, laptop computer, or similar electronic device having a dedicated display screen. Alternatively, display device 28 can assume the form of an independent device, such as a freestanding monitor or television set, which is connected to client media receiver 26 via a wired or wireless connection. Any such video output signals may be formatted in accordance with conventionally-known standards, such as S-video, HDMI, SPDIF, DVI, or IEEE 1394 standards, as appropriate.

By way of non-limiting illustration, client media receiver 26 is shown in FIG. 1 as containing at least one processor 41 configured to selectively execute computer-readable software instructions, in conjunction with associated memory 42 and conventional I/O features 44. I/O features 44 can include various different types of interfaces, such as a network interface, an interface to mass storage, an interface to display device 28, and any number of user input interfaces. Client media receiver 26 may execute a software program or browser player 46 directing the various hardware features of client media receiver 26 to perform the functions described herein. Browser player 46 suitably interfaces with processor 41, memory 42, and I/O features 44 via any conventional operating system 48 to provide such functionalities. Software application can be placeshifting application in embodiments in which placeshifting device 22 assumes the form of a STB, DVR, or similar electronic device having placeshifting capabilities. In such embodiments, placeshifting device 22 will typically be located within the residence of the end user, although this not strictly necessary. In certain realizations, client media receiver 26 may be implemented utilizing special-purpose hardware or software, such as the SLING-CATCHER-brand products available from SLING MEDIA INC. currently headquartered in Foster City, Calif.

Browser player 46 suitably includes control logic 50 adapted to process user input, obtain streaming content 30 from one or more content sources, decode received content streams, and provide corresponding output signals to display device 28. In this regard, control logic 50 may establish a data sharing connection with the remote placeshifting device 22 enabling wireless bidirectional communication with control module 40 such that a placeshifting session can be established and maintained. During a placeshifting session, placeshifting device 22 streams placeshifted content 30 to client media receiver 26 over communications network 24. Such streaming content can contain any visual or audiovisual programming including, but not limited to, streaming OTT television programming and VOD content. The streaming content is received by client media receiver 26 and decoded by decoding module 52, which may be implemented in hardware or software executing on processor 41. The decoded programming is then provided to a presentation module 54, which generates output signals to display device 28 for presentation to the end user operating client media receiver 26. In some embodiments, presentation module 54 may combine decoded programming (e.g., programming from multiple streaming channels) to create a blended or composite image; e.g., as schematically indicated in FIG. 1, one or more PIP images 56 may be superimposed over a main or primary image generated on a screen of display device 28.

In operation, control logic 50 of client media receiver 26 obtains programming in response to end user input or commands received via a user interface, such as a touchscreen or keyboard interface, included within I/O features 44 of client media receiver 26. Control logic 50 may establish a control connection with remote placeshifting device 22 via communications network 24 enabling the transmission of commands from control logic 50 to control module 40. Accordingly, placeshifting device 22 may operate by responding to commands received from a client media receiver 26 via communications network 24, as indicated by arrow 58. Such commands may include information utilized to initiate a placeshifting session with placeshifting device 22, such as data supporting mutual authentication of placeshifting device 22 and client media receiver 26. In embodiments in which placeshifting device 22 assumes the form of a consumer placeshifting device, such as an STB or DVR located in an end user's residence, control commands 58 may include instructions to remotely operate placeshifting device 22 as appropriate to support the current placeshifting session.

As further indicated in FIG. 1 by double-headed arrow 60, consumer placeshifting device 22 usefully communicates with an mDRM headend 62 through communications network 24. When present, mDRM headend 62 functions essentially as a dedicated point-of-contact or data-aggregating intermediary for placeshifting device 22 in a manner facilitating information exchange between device 22 and multiple license servers 64. As discussed more fully below in conjunction with FIGS. 2-3, mDRM headend 62 may collect DRM initialization instructions or parameters from license servers 64 and forward such instructions to placeshifting device 22, on an as-needed basis. Each DRM license server 64 may be associated with a different type of DRM platform and, thus, issue a different type of platform-specific DRM license. To provide an arbitrary, but illustrative example, DRM license server 64-1 may be a PLAYREADY license server, which issues PLAYREADY DRM licenses; DRM license server 64-2 may be a WIDEVINE license server, which issues WIDEVINE DRM licenses; DRM license server 64-n may be a FAIRPLAY license server, which issues FAIRPLAY DRM licenses; and so on for any number and type of DRM license servers. Although only three DRM license servers 64 are shown in FIG. 1, cloud license service 66 may encompass any practical number of DRM license servers. Accordingly, DRM license servers 64 are labeled as servers 64-1, 64-2 . . . 64-n to further emphasize mDRM headend 62 may communicate with any number of license servers greater than one. Collectively, license servers 64 and mDRM headend may be implemented as a cloud license service 66 to which consumer placeshifting device 22 may be subscribed.

When receiving an initiation request to engage in a placeshifting session, consumer placeshifting device 22 performs those steps appropriate to obtain a placeshifting encryption key. In various embodiments, placeshifting device 22 retrieves the appropriate placeshifting encryption key from mDRM headend 62. For security purposes, authentication of placeshifting device 22 may be required by mDRM headend 62 prior to transmission of the placeshifting encryption key to device 22. To facilitate placeshifting device authentication, mDRM headend 62 may maintain a database of authorized placeshifting devices, such as in-service STBs distributed amongst the residences of subscribers to a cable or satellite television service. The authenticity of placeshifting device 22, and other such placeshifting devices, may be verified by mDRM headend 62 utilizing unique identifying information contained the database. For example, mDRM headend 62 may utilize the database to confirm the accuracy of unique identifying information assigned to device 22, such as a pre-assigned public key, during the authentication process. Afterwards, client media receiver 26 obtains a corresponding placeshifting decryption key from the appropriate DRM license server 64, whether by communicating directly with the license server or by communicating with mDRM headend 62 as an intermediary. The placeshifting encryption and decryption keys are usefully, although not necessarily generated by mDRM headend 62 as symmetrical or asymmetrical key pairs, as explained in more detail below.

When received by client media receiver 26, the encrypted content stream is supplied to browser player 46. Recognizing that encryption has been applied to the placeshifted content stream, browser player 46 commences retrieval of a corresponding DRM license to obtain the placeshifting decryption key required to decrypt the content stream. Browser player 46 may utilize information contained in the DRM initialization instructions, which are transmitted along with the encrypted content stream, to contact the appropriate license server and obtain the DRM license therefrom. For example, in an embodiment, browser player 46 may identify URL address for the DRM license server, which issues the DRM license type corresponding to a DRM license platform supported by player 46. Browser player 46 may follow the URL address to retrieve the required DRM license type from the appropriate license server, and extracts the placeshifting decryption key from the DRM license. Utilizing the newly-extracted placeshifting decryption key, browser player 46 decodes and renders the content stream on a display screen associated with (e.g., included in or operably coupled to) client media receiver 26 for viewing by the end user. By way of non-limiting example, additional description of different manner in which the foregoing process may be implemented will now be provided in conjunction with FIGS. 2-3.

Figure 2:
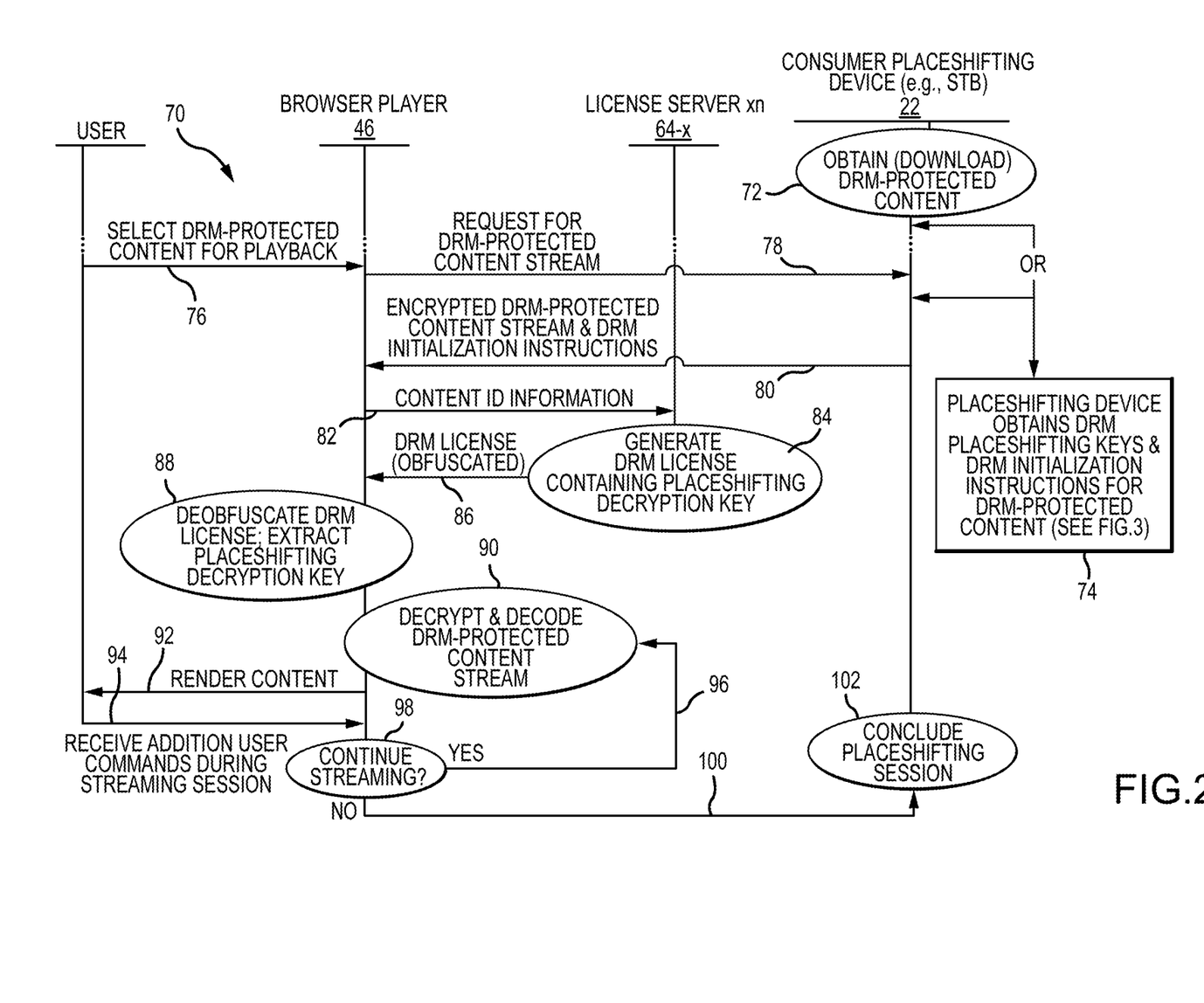
FIG. 2 is a message timing diagram illustrating an exemplary process during which the consumer placeshifting device, the client media receiver, and one or more a DRM license servers communicate over a network in a manner enhancing the ease and effectiveness with which digital rights management is implemented across multiple platforms in placeshifting environments, as illustrated in accordance with an exemplary embodiment of the present disclosure.

FIG. 2 is a message timing diagram illustrating an exemplary process 70 (hereafter, "DRM-protected placeshifting process 70") enabling the effective and essentially seamless implementation of DRM schemes across multiple different platform types in placeshifting environments. Certain aspects of DRM-protected placeshifting process 70 are carried-out by consumer placeshifting device 22 and browser player 46, as executed on client media receiver 26 and described above in conjunction with FIG. 1. Other complementary aspects of placeshifting process 70 may be carried-out by one or more DRM license servers 64 and mDRM headend 62, as further discussed below in conjunction with FIG. 3. While only a single DRM license server (identified as "license server 64-x") is shown in the message timing diagram of FIG. 2 for clarity, the below-described process steps may be performed in connection with any practical number DRM license servers, as indicated by the label "xn" appearing adjacent the upper right corner of server 64-x.

DRM-protected placeshifting process 70 commences as consumer placeshifting device 22 initially stores DRM-protected content in memory (FUNCTION 72, FIG. 2). When assuming the form of an STB, DVR, or a similar device, consumer placeshifting device 22 may obtain the DRM-protected content by recording programming into an internal memory 42 or into an external storage device operably coupled to placeshifting device 22. Such programming may be provided over a satellite or cable distribution system, which may contain satellite 34 in communication with a satellite receiver 36 operably connected to placeshifting device 22 as shown in FIG. 1. In certain implementations, consumer placeshifting device 22 may also obtain DRM initialization instructions or parameters corresponding to the newly-obtained DRM-protected content at this juncture, particularly if placeshifting device 22 has been made aware of an intent on behalf of an end user to stream the content to client media receiver 26 during an impending placeshifting session. Alternatively, placeshifting device 22 may await receipt of requests from client media receiver 26 to commence a new placeshifting session before obtaining DRM initialization instructions for the DRM-protected content (FUNCTION 74, FIG. 2).

DRM-protected placeshifting process 70 continues as user input is received at client media receiver 26 identifying the specific DRM-protected content that is desirably placeshifted from consumer placeshifting device 22 to receiver 26 (ACTION 76, FIG. 2). In response to this user input, client media receiver 26 transmits a corresponding request or command for the selected DRM-protected content to placeshifting device 22 (TRANSMISSION 78, FIG. 2). After proper authentication of client media receiver 26, placeshifting device 22 initiates streaming transmission of the DRM-protected content over network 24 (FIG. 1). In accordance with established placeshifting techniques, placeshifting device 22 may transcode a live captured stream, as generated at device 22, encrypt the captured stream, and packetize the encrypted data for streaming transmission to receiver 26 over communications network 24 (FIG. 1). Notably, placeshifting device 22 encodes the captured stream in an encrypted format utilizing, at least in part, the placeshifting encryption key previously downloaded from mDRM headend 62 or another source. In one embodiment, the placeshifting key assumes the form of an AES symmetric encryption key, which is generated to contain IV data. Any currently-known or subsequently-developed standard can be employed for encryption purposes including, for example, CENC standard ISO/IEC 23001-7. The encrypted content stream is then transmitted to client media receiver 26, which feeds the encrypted stream to browser player 46 for presentation on display device 28.

During DRM-protected placeshifting process 70, placeshifting device 22 requests the appropriate placeshifting encryption key (e.g., a symmetric AES key including IV data) and the associated DRM initialization instructions from mDRM headend 62 or another source. This request may be transmitted through a secure channel, such as an HTTP channel with client authentication, to mDRM headend 62. Unique placeshifting device authorization by mDRM headend 62 may be required at this juncture. For example, and as briefly discussed above, a database of authorized placeshifting devices may be utilized by mDRM headend 62 in placeshifting device authentication. This database is conveniently maintained at mDRM headend 62, but this is not required providing that such a database is made accessible to headend 62 as needed. Utilizing such a placeshifting device authentication database, mDRM headend 62 may verify the authenticity of placeshifting device 22 by ensuring that unique identifying information provided by device 22 matches the corresponding information held in the database for device 22. In one approach, public keys uniquely identifying a plurality of consumer placeshifting devices (e.g., STBs) are stored in the placeshifting device authentication database. During TRANSMISSION 78 (FIG. 2), placeshifting device 22 provides its unique public key in a signature contained in the request message, and mDRM headend 62 verifies that the public key provided by device 22 matches that stored in the database before further proceeding with placeshifting process 70.

Figure 3:
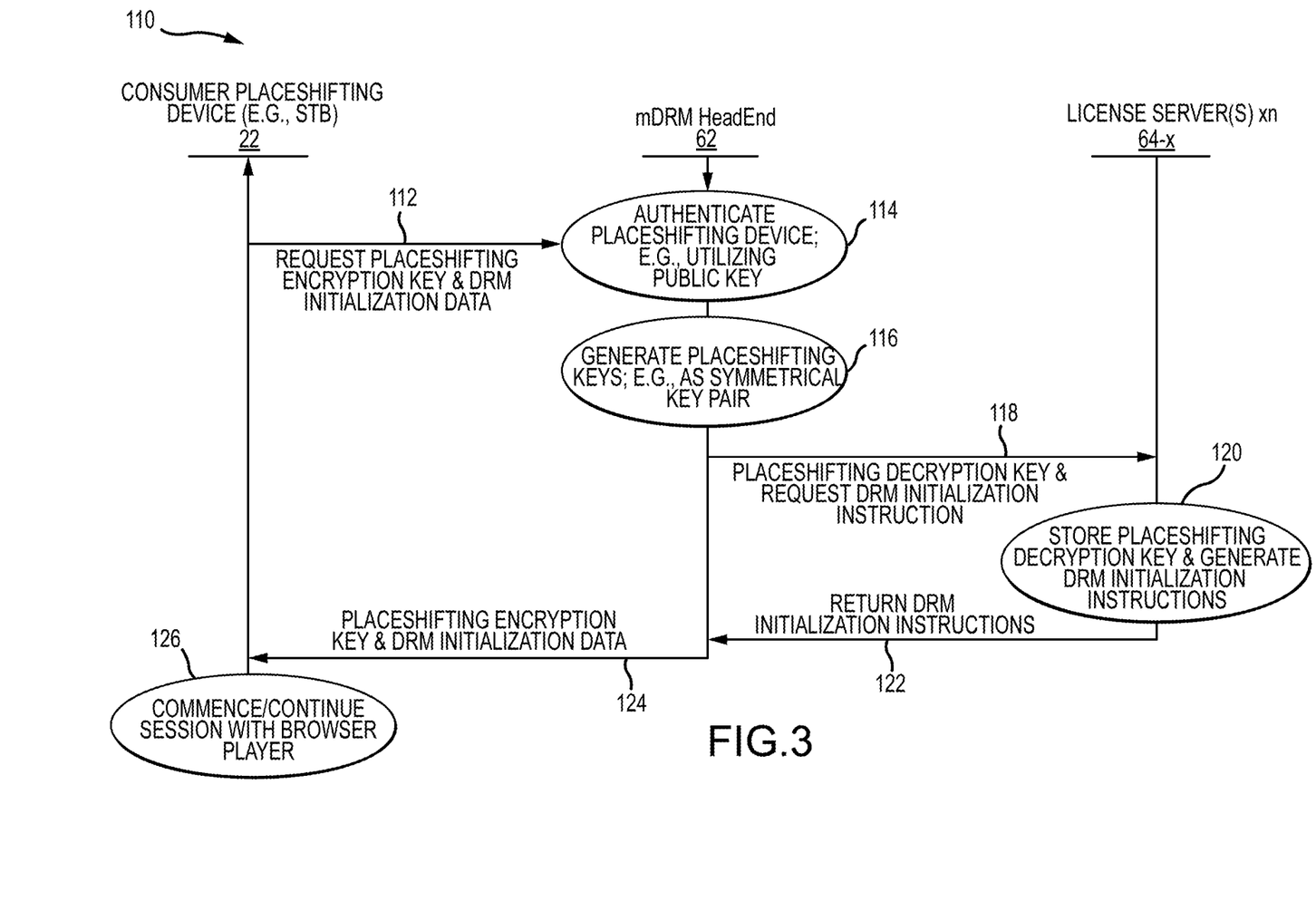
FIG. 3 is a message timing diagram illustrating one possible manner in which the browser player, as executed on the client media receiver schematically shown in FIG. 1, may communicate with one or more license servers through a dedicated server interface or mDRM headend to obtain placeshifting keys and corresponding DRM initialization instructions, as appropriate, to support the exemplary placeshifting process set-forth in FIG. 2.

After placeshifting device authorization, mDRM headend 62 obtains an appropriate placeshifting encryption key and forwards this key to placeshifting device 22. The placeshifting encryption key is conveniently, although not necessarily generated by mDRM headend 62 itself. In embodiments wherein headend 62 generates the placeshifting encryption key, mDRM headend 62 may simultaneously or concurrently generate a corresponding placeshifting decryption key, which is then forwarded by headend 62 to one or more of DRM license server(s) 64-*x*; e.g., digital copies of the placeshifting decryption key may be forwarded to all servers or a subset of the servers contained within cloud license service 66 (FIG. 1). Upon receipt of the placeshifting decryption key from headend 62, DRM license servers 64-*x* store the received placeshifting decryption key in memory for subsequent generation of licenses for the supported DRMs platforms. Additionally, DRM license servers 64 may each respond to mDRM headend 62 with any appropriate DRM initialization instructions, some or all of which headend 62 may then forward to placeshifting device 22 at an appropriate juncture. The DRM initialization instructions may contain, for example, information identifying the appropriate location at which browser player 46 can obtain DRM licenses, which contain the placeshifting decryption key required to decrypt the placeshifted content.

When encountering the encrypted stream provided by placeshifting device 22 as TRANSMISSION 80 (FIG. 2), browser player 46 searches for the supported DRM initialization instructions. In an embodiment, a CDM or similar module contained within or otherwise associated with browser player 46 utilizes contact information contained in the initialization instructions to locate the appropriate DRM license server for retrieval of the DRM license. The CDM and, more generally, browser player 46 then utilizes the contact information to establish a connection with the server for acquisition of a DRM license containing the placeshifting decryption key. In embodiments, the contact information contains URL addresses for contacting multiple DRM license servers to acquire the requisite DRM license, with each DRM license server issuing licenses for a different type of DRM platform. Browser player 46 may then select the appropriate DRM license server to contact based upon the DRM platform type or platform types supported by player 46. When requesting the DRM license, browser player 46 may also forward identification information to selected DRM license server 64-*x*, as indicated in FIG. 2 at TRANSMISSION 82. The identification information may uniquely identify client media receiver 26 and/or the media content that is desirably placeshifted. In response, and providing that all relevant security measures are satisfied, DRM license server 64-*x* generates the appropriate DRM license for browser player 46 (FUNCTION 84, FIG. 2). DRM license server 64-*x* responds to browser player 46 with the newly-generated DRM license (FUNCTION 86, FIG. 2). In embodiments, DRM license server 64-*x* may provide the DRM license in an obfuscated format. CDM module of browser player 46 may then de-obfuscates the DRM license to obtain the clear placeshifting decryption key (FUNCTION 88, FIG. 2) and continue with DRM-protected placeshifting process 70.

With the appropriate placeshifting decryption key secured, browser player 46 is now able to decrypt, decode, and present the placeshifted content stream for presentation to the end viewer operating client media receiver 26 (FUNCTION 90, FIG. 2). In so doing, browser player 46 and, more generally, client media receiver 26 may output the appropriate audiovisual signals to display device 28 for presentation to the end user (FUNCTION 92, FIG. 2). As the currently-established placeshifting session continues, browser player 46 and, more generally, client media receiver 26 monitors for additional user commands received at client media receiver 26 to allow the end user to control playback of the placeshifted media stream, as he or she desires (FUNCTION 94, FIG. 2). Furthermore, as indicated in FIG. 2 by FUNCTIONS 96, 98, 100, the above-described process steps are repeated, as appropriate, until the end user supplies input or commands indicating that the current placeshifting session is desirably terminated. When determining that the current placeshifting session should be termination, browser player 46/client media receiver 26 transmits a corresponding signal to consumer placeshifting device 22 instructing device 22 to cease transmission of the DRM-protected content (FUNCTION 102, FIG. 2). This concludes the present iteration of DRM-protected placeshifting process 70. Additional iterations of process 70 may be subsequently performed, as appropriate, to support DRM protection in future placeshifting sessions established between client media receiver 26 and placeshifting device 22.

Turning now to FIG. 3, there is shown an exemplary message sequence diagram 110 illustrating one manner in which browser player 46 (as executed on client media receiver 26) and license server(s) 64-x may interface with mDRM headed 62 to obtain placeshifting keys and DRM initialization instructions, as appropriate to support DRM-protected placeshifting process 70 described above in conjunction with FIG. 2. Referring collectively to FIGS. 1-3, sub-process 110 commences when client media receiver 26 requests a placeshifting encryption key and corresponding DRM initialization instructions from mDRM headend 62 (TRANSMISSION 112, FIG. 3). This request may be transmitted through a secure channel established utilizing, for example, HTTP over secure socket layer/transport layer security with client authentication. Unique placeshifting device authorization by mDRM headend 62 may be required (FUNCTION 114, FIG. 3). As explained above, the signature present in the request message may be verified utilizing a unique public key of placeshifting device 22. In an embodiment, the public keys of all authorized placeshifting devices may be compiled in a database, which is maintained within or otherwise is accessible to mDRM headend 62 in the manner previously described.

After placeshifting device authorization, mDRM headend 62 generates an appropriate placeshifting key pairs (FUCNTION 116, FIG. 3). The key pair includes a placeshifting encryption key and a placeshifting decryption key, which can be generated utilizing various different symmetric or asymmetric key generation algorithms. Next, mDRM headend 62 forwards the placeshifting decryption key to one or all of license server(s) 64-x over an established, securitized channel (FUNCTION 118, FIG. 3). As previously discussed, license server(s) 64-x each store the newly-received placeshifting decryption key in local memories such that server(s) 64-x are able to retrieve the placeshifting decryption key, as needed. Specifically, as described above in connection with FUNCTION 84 of DRM-protected placeshifting process 70 (FIG. 2), server(s) 64-x may recall the placeshifting decryption key when generating licenses for supported the DRM platforms (FUNCTION 120, FIG. 3). Server(s) 64-x may package or embed the placeshifting decryption key in such subsequently-generated DRM licenses, when such licenses are appropriately produced and provided to client media receiver 26 when properly authorized, as discussed above in connection with FUNCTIONS 82, 84, 86 of master process 70 (FIG. 2).

With continued reference to FIG. 3, at FUNCTION 122 of sub-process 110, DRM license server(s) 64-x further generate and reply to mDRM headend 62 with appropriate DRM initialization instructions. The DRM initialization instructions generated by each server 64-x may include DRM platform-specific information on contacting the DRM license servers and obtaining DRM licenses of varying types. For example, a first license server may provide DRM initialization instructions suitably utilized by browser player 46 to obtain PLAYREADY DRM licenses; a second license server may provide DRM initialization instructions suitably utilized by player 46 to obtain WIDEVINE DRM licenses; a third license server may provide DRM initialization instructions suitably utilized by player 46 to obtain PRIMETIME DRM licenses; and so on. Serving as a data aggregator, mDRM headend 62 gathers such platform-specific DRM initialization instructions, packages the instructions, and then forwards the packaged DRM initialization instructions to client media receiver 26 (TRANMISSION 124, FIG. 3) along with the encrypted content stream. Client media receiver 26 may then continue the placeshifting session (FUNCTION 126, FIG. 3) in accordance with the larger DRM-protected placeshifting process 70.

There has thus been provided systems, methods, and program products enhancing the ease and effectiveness with which digital rights management is implemented across multiple platforms in placeshifting environments. In certain embodiments of the above-described methods, a live content stream is captured by the consumer placeshifting device, such an STB located in the residence of the end user, which transcodes and streams the live stream to the client media receiver. Public-key encryption, private-key encryption, symmetric-key encryption, or another encryption approach may be utilized to generate an encrypted stream, which can be decrypted using a placeshifting decryption key obtained by the client media receiver. In one specific example, the placeshifting device may obtain a symmetric key, which may include AES and IV information. This data is conveniently obtained from a mDRM headend over a secure channel. After the end user connects to the placeshifting device and initiates playback of the streamed content, the placeshifting device transcodes the live captured streams and encrypts the stream utilizing the symmetric key (e.g., AES and IV data) downloaded from the mDRM headend. The browser player then decodes and renders the content stream on the screen of a display device associated with the placeshifting device for viewing by the end user.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A method for implementing Digital Rights Management (DRM), the method comprising:
   storing, in a memory associated with east one DRM license server of a plurality of DRM license servers, a placeshifting decryption key wherein the placeshifting decryption key is used to generate one or more licenses for at least one type of supported DRM platform;
   identifying with DRM initialization instructions, an appropriate location to contact a selected one of the plurality of DRM license servers, each of which issues at least one DRM license for one or more different types of DRM platforms, at which a browser player can obtain at least one DRM license related to the placeshifting decryption key;
   selecting the at east one DRM license server to obtain the at least one DRM license based on identified location;

determining, whether the at least one DRM license server supports a chosen type of DRM platform to transmit DRM-protected content;

streaming the DRM-protected content over a communication network in an encrypted format made accessible with the placeshifting decryption key on the chosen type of DRM platform;

in response to enabling a DRM protected placeshifting, obtaining a placeshifting encryption key in communication with the plurality of DRM license servers each configured to issue a different DRM license type; and utilizing the placeshifting encryption key which has been obtained to encrypt the DRM-protected content streamed to a client media receiver.

2. The method of claim 1, further comprising: including, in the DRM initialization instructions an Universal Resource Locator (URL) address of a DRM license server.

3. The method of claim 2, wherein the URL address of the at least one DRM license server is from which a DRM license can be obtained by the browser player.

4. The method of claim 3 wherein streaming comprises transmitting, over the communications network, a public key uniquely identifying a placeshifting device.

5. The method of claim 4, further comprising: using the public key to enable authentication of the placeshifting device.

6. The method of claim 1, further comprising: receiving DRM platform-specific initialization information for the plurality of DRM license servers; and transmitting the DRM platform-specific initialization instructions to the client media receiver as part of the DRM initialization instructions.

7. The method of claim 6 further comprising including, in the DRM platform-specific initialization instructions, Universal Resource Locator (URL) addresses for each of the plurality of DRM license servers.

8. The method of claim 6 wherein transmitting the DRM initialization instructions comprises embedding the DRM initialization instructions in the streamed DRM-protected content.

9. The method of claim 1 wherein the placeshifting encryption key is a symmetric key containing initialization vector data.

10. The method of claim 9 further comprising:
providing DRM initialization instructions to the client media receiver of the placeshifting decryption key, and the DRM initialization instructions containing the DRM initialization instructions received from each of the plurality of DRM license servers.

11. The method of claim 10, further comprising:
verifying an authenticity of a placeshifting device by ensuring that unique identifying information provided by the placeshifting device matches corresponding information held in a public key database.

12. A method for implementing Digital Rights Management (DRM) during a placeshifting session, the method comprising:
storing, in a memory associated with at least one DRM license server of a plurality of DRM license servers, a placeshifting decryption key wherein the placeshifting decryption key is used in generating one or more licenses associated with a plurality of types of supported DRM platforms;

identifying with DRM initialization instructions, an appropriate location for contacting a selected one of the plurality of DRM license servers, each of which issues at least one DRM license for one or more types of DRM platforms, at which a browser player can obtain at least one DRM license related to the placeshifting decryption key;

selecting the at least one DRM license server from which to obtain at least one DRM license;

determining, whether a DRM license server supports a chosen type of DRM platform of the plurality of types of supported DRM platforms to transmit DRM-protected content;

streaming the DRM-protected content in an encrypted format that can be accessed by the placeshifting decryption key on the chosen type of DRM platform;

in response to enabling a DRM protected placeshifting, obtaining a placeshifting encryption key in communication with the plurality of DRM license servers each configured to issue a different DRM license type; and utilizing the placeshifting encryption key to encrypt the DRM-protected content streamed to a client media receiver.

13. The method of claim 12, further comprising: including, in the DRM initialization instructions a Universal Resource Locator (URL) address of the at least one DRM license server.

14. The method of claim 12 wherein each placeshifting decryption key associated with each one of the plurality of DRM license servers is each configured to issue the different DRM license type.

15. The method of claim 14 further comprising: in response to a transmitting of the placeshifting decryption key over a communications network, receiving DRM initialization instructions from each of the plurality of DRM license servers.

16. The method of claim 15 further comprises including, in the DRM initialization instructions, Universal Resource Locator (URL) addresses for each of the plurality of DRM license servers.

17. The method of claim 16 wherein the placeshifting decryption key is a symmetric key pair containing initialization vector data.

18. The method of claim 12, further comprising:
verifying an authenticity of a placeshifting device by ensuring that unique identifying information provided by the placeshifting device matches corresponding information held in the public key database.

19. A method for implementing Digital Rights Management (DRM) during a placeshifting session for executing a browser player, the method comprising:
storing, in a memory associated with at least one DRM license server of a plurality of DRM license servers, the placeshifting decryption key, to generate one or more licenses for at least one type of supported DRM platform;

identifying, an appropriate location for contacting a selected one of the plurality of DRM license servers, each of which issues at least one DRM license for one or more different types of DRM platforms, at which the browser player can obtain at least one DRM license related to the placeshifting decryption key;

selecting via initial at least one DRM license server to obtain the at least one DRM license;

determining, whether the at least one DRM license server supports a chosen type of DRM platform from the one or more different types of DRM platforms to transmit DRM-protected content;

streaming the DRM-protected content over a communication network in an encrypted format made accessible with the placeshifting decryption key on the chosen type of DRM platform;

in response to enabling a DRM protected placeshifting, obtaining a placeshifting encryption key over the communication network from the at least one DRM license server of the plurality of DRM license servers each configured to issue a different DRM license type; and utilizing the placeshifting encryption key to encrypt the DRM-protected content streamed to a client media receiver.

* * * * *